United States Patent [19]

Di Paolo

[11] Patent Number: 5,074,106
[45] Date of Patent: Dec. 24, 1991

[54] GRASS CATCHER HAVING IMPROVED AIR FLOW CHARACTERISTICS

[76] Inventor: Vincent Di Paolo, 330 Childs Ave., Garden City South, N.Y. 11530

[21] Appl. No.: 613,314

[22] Filed: Nov. 14, 1990

[51] Int. Cl.⁵ .................................... A01D 34/70
[52] U.S. Cl. ................................ 56/202; 56/205; 56/320.2; 56/DIG. 9
[58] Field of Search ............... 56/13.3, 16.6, 17.5, 56/202, 320.1, 320.2, DIG. 8, DIG. 9, 205, 206

[56] References Cited

U.S. PATENT DOCUMENTS

| | | | |
|---|---|---|---|
| 3,014,330 | 12/1961 | Oberdick | 56/202 X |
| 3,606,747 | 9/1971 | Bauman | 56/202 |
| 3,706,189 | 12/1972 | Rutherford | 56/202 X |
| 4,250,698 | 2/1981 | Pappalardo et al. | 56/202 |
| 4,665,684 | 5/1987 | Di Paolo | 56/202 |

*Primary Examiner*—Terry L. Melius
*Attorney, Agent, or Firm*—Anthony J. Casella; Gerald E. Hespos

[57] ABSTRACT

A grass catcher is provided for mounting to a lawn mower. The grass catcher includes a generally frustum shaped side wall and opposed front and rear walls. An angularly inclined entrance chute is provided adjacent the front wall. The front wall includes an inclined portion which is angled relative to the axis of the grass catcher. The side wall is provided with a plurality of elongated slots extending circumferentially around the grass catcher. The rear wall of the grass catcher is hingedly attached to the side wall to facilitate emptying of the grass clippings therefrom.

16 Claims, 3 Drawing Sheets

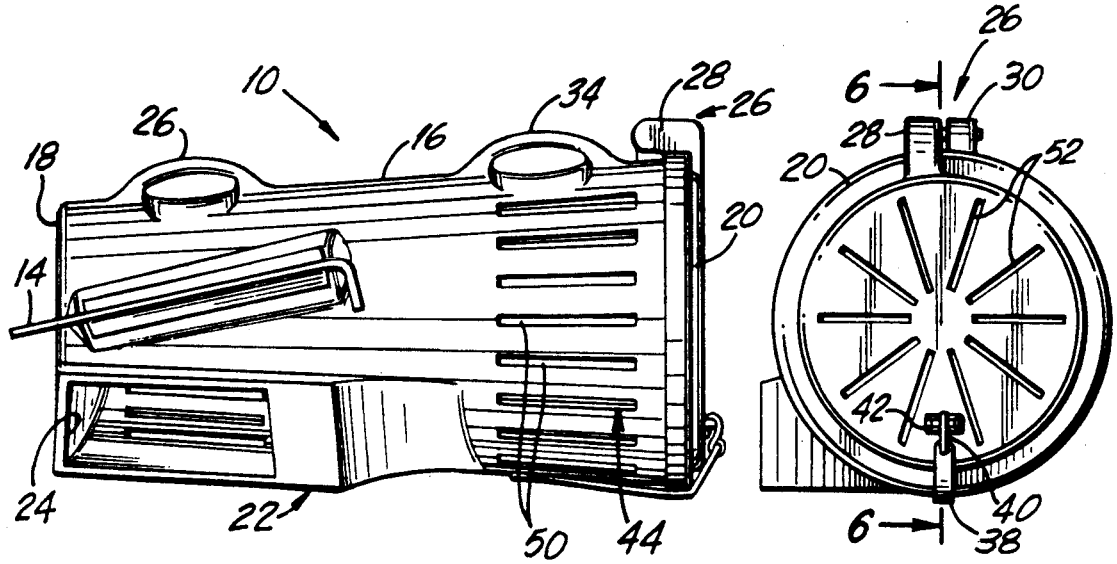
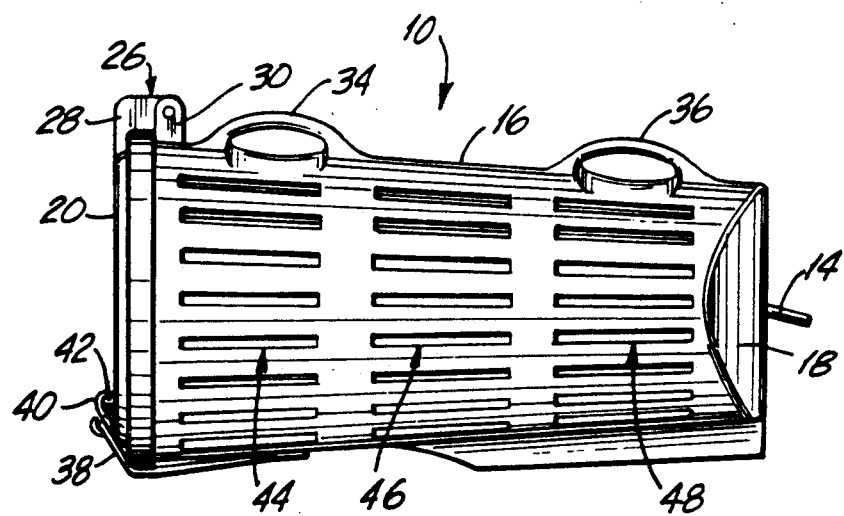

GRASS CATCHER HAVING IMPROVED AIR FLOW CHARACTERISTICS

BACKGROUND OF THE INVENTION

Grass cutting lawn mowers, in particular rotary power mowers are commonly used for the maintenance and care of residential lawns. Rotary power mowers have a cowling for housing one or more rotating cutting blades with a lateral opening in the cowling for discharging grass clippings, leaves, twigs and debris at a substantial velocity. In determining the most effective means of collecting the discharged materials certain factors must be considered. First, the extremely high velocity imparted to the materials by the rotating blades presents a safety hazard as these materials are discharged from the cowling. Second, the discharging conduit must effectively deliver the grass clippings from the cowling to the catcher without clogging the discharge cowling. Additionally, the catcher must be shaped such that there are no pockets for trapping the clippings and reducing efficient flow of the clippings from the cutting area to the grass catcher.

Prior art grass catchers have taken a variety of forms. For example, many older grass catchers are open topped trays into which the clippings are sent. Often, however, the grass clippings are blown away from the open topped grass catcher by the action of wind or air currents created by the moving lawn mower blades. These open topped grass catchers also are difficult to empty neatly. Furthermore, ecologists have determined that it is extremely undesirable to have grass clippings, which may contain organic pollutants such as nitrogen based fertilizers, to be freely dispersed into the environment through wind action. Moreover, upon decomposing, the grass clippings will release the organic pollutants into the environment, thereby creating a potential hazard to animal life, as well as the possibility of ground water contamination.

Other prior art grass catchers define flexible bags that are attached to the discharging conduit of a power lawn mower. These flexible bags often are provided with either an internal or an external support to keep the bag substantially open, thus facilitating the flow of clippings into the grass catcher. Many such grass catchers are subject to rapid deterioration either due the decaying action of wet grass clippings adjacent the material bag or due to the various stresses created on the material by the supporting structure. Furthermore, the material from which the bags are made generally provides a poor air flow. Consequently, the grass clippings often accumulate near the mouth of the prior art grass catcher, thus preventing a complete filling of the bag.

Still other prior art grass catchers have been made from a heavy duty metallic mesh material. These structures have been fairly heavy and costly to manufacture. Furthermore, the metallic materials are particularly susceptible to deterioration when subjected to the moisture present in the grass clippings and the various fertilizing chemicals that may be used on a lawn. Thus, the prior art metallic mesh grass catchers must either be made from either an expensive grade of material that is not subject to decay or they require extensive maintenance to prevent such decay.

An extremely efficient prior art grass catcher is disclosed in U.S. Pat. No. 4,665,684 entitled "GRASS CATCHER WITH EFFICIENT AIR FLOW" which issued to the applicant herein on May 19, 1987. The grass catcher disclosed in U.S. Pat. No. 4,665,684 is a container of generally tapered cylindrical or frustum shape formed from a light weight but sturdy plastic material. The grass catcher is provided with a plurality of spaced apart apertures which extend therethrough to encourage a circulatory air flow. The spaced apart apertures enable a sufficient escape of air to avoid the random rebounding of the grass clippings within the grass catcher. As a result of this construction, some of the air which transports the grass clippings will be able to flow through virtually each aperture of the side wall of the grass catcher even when grass clippings are gravitationally deposited on the bottom of the grass catcher. This pattern of air flow through the side wall will achieve a circulatory air flow with an enhanced ability to transport the grass clippings to the far end of the grass catcher. This circulatory air flow is enhanced by the tapered or frustum shape of the grass catcher. The preferred air flow is further attained by forming the smaller end of the grass catcher, or the end thereof closer to the discharge conduit of the lawn mower, as a solid surface substantially free of apertures.

The grass catcher disclosed in U.S. Pat. No. 4,665,684 is easily opened to provide for convenient dumping of the clippings from the grass catcher after it has been completely filled. The grass catcher also includes metallic handles to facilitate the lifting and dumping of the filled grass catcher.

Although the grass catcher disclosed in U.S. Pat. No. 4,665,684 is extremely efficient the plurality of circular apertures provided in the walls thereof may have the effect of developing a turbulent boundary layer of air flow adjacent the walls of the grass catcher which could effect the quality of the desired circulatory air flow. Furthermore, to manufacture the grass catcher disclosed in U.S. Pat. No. 4,665,684 requires a substantial amount of machining time since it is necessary to individually drill each aperture.

Therefore, it is an object of the subject invention to provide a grass catcher having means for improving the cyclonic air flow therein.

It is a further object of the subject invention to reduce the manufacturing costs associated with machining a grass catcher having a plurality of apertures.

It is another object of the subject invention to provide a grass catcher having few metallic parts that are susceptible to deterioration.

SUMMARY OF THE INVENTION

The subject invention is directed to a grass catcher that defines a container of generally tapered cylindrical or frustum shape. More particularly, the end most distant from the discharging conduit of the power lawn mower is of greater area than the end closest to the discharging conduit of the lawn mower.

The tapered cylindrical or frustum shaped side walls of the grass catcher are formed from a light weight but sturdy plastic material and are provided with a plurality of spaced apart elongated slots extending therethrough. The size of the slots and the spacing therebetween is selected to encourage cyclonic air flow within the grass catcher and to promote laminar air flow immediately adjacent the walls thereof. More particularly, the elongated rectangular slots permit continuous and undisturbed air flow adjacent the walls of the catcher, and hence there is no reduction in the velocity of the air flow leaving the discharge conduit of the power mower. Thus, grass clippings are effectively deposited at the far end of the grass catcher.

In a preferred embodiment, the elongated slots are provided in parallel spaced apart relationship and are disposed in three regions of the container. In particular, a series of elongated slots are provided adjacent the front end of the container, intermediate the container, and adjacent the rear end of the container. Thus, a continuous and undisturbed flow of air may be directed from the discharge conduit of the power mower to the rear end of the grass catcher.

This circulatory or cyclonic air flow is enhanced by the tapered or frustum shape of the grass catcher. The preferred air flow is further attained by forming the smaller end of the grass catcher, or the end thereof closest to the discharge conduit of the power mower, as a solid surface substantially free of elongated slots. Furthermore, the smaller end of the grass catcher is formed with an angularly inclined surface to further enhance the cyclonic flow of the air entering the grass catcher. To still further enhance the cyclonic flow of air entering the grass catcher the entrance chute is inclined at an angle equal to the inclination of the angled surface of the smaller end of the grass catcher.

The larger circular end of the grass catcher preferably is hingedly attached to the tapered wall thereof. More particularly, a molded hinge is unitarily formed in both the side wall of the grass catcher and the circular end wall thereof to enable hinged articulated movement therebetween. An appropriate closure means can be provided opposite the hinge to enable the secure closure of the grass catcher. However, the grass catcher can be easily opened to provide a large and convenient opening for dumping the clippings from the grass catcher after it has been completely filled. One preferred closure means includes an elastic strap having the hook on at least one end thereof. The strap can be biased such that the hook engages a unitarily molded engaging member on the side wall of the grass catcher opposite the hinged wall.

BRIEF DESCRIPTION OF THE DRAWINGS

FIG. 2 is a side elevational view of the grass catcher of the subject invention.

FIG. 3 is a front end view of the grass catcher of the subject invention as viewed from the right in FIG. 1.

FIG. 4 is a second side elevational view of the grass catcher of the subject invention.

DETAILED DESCRIPTION OF THE PREFERRED EMBODIMENT

Figure 1:
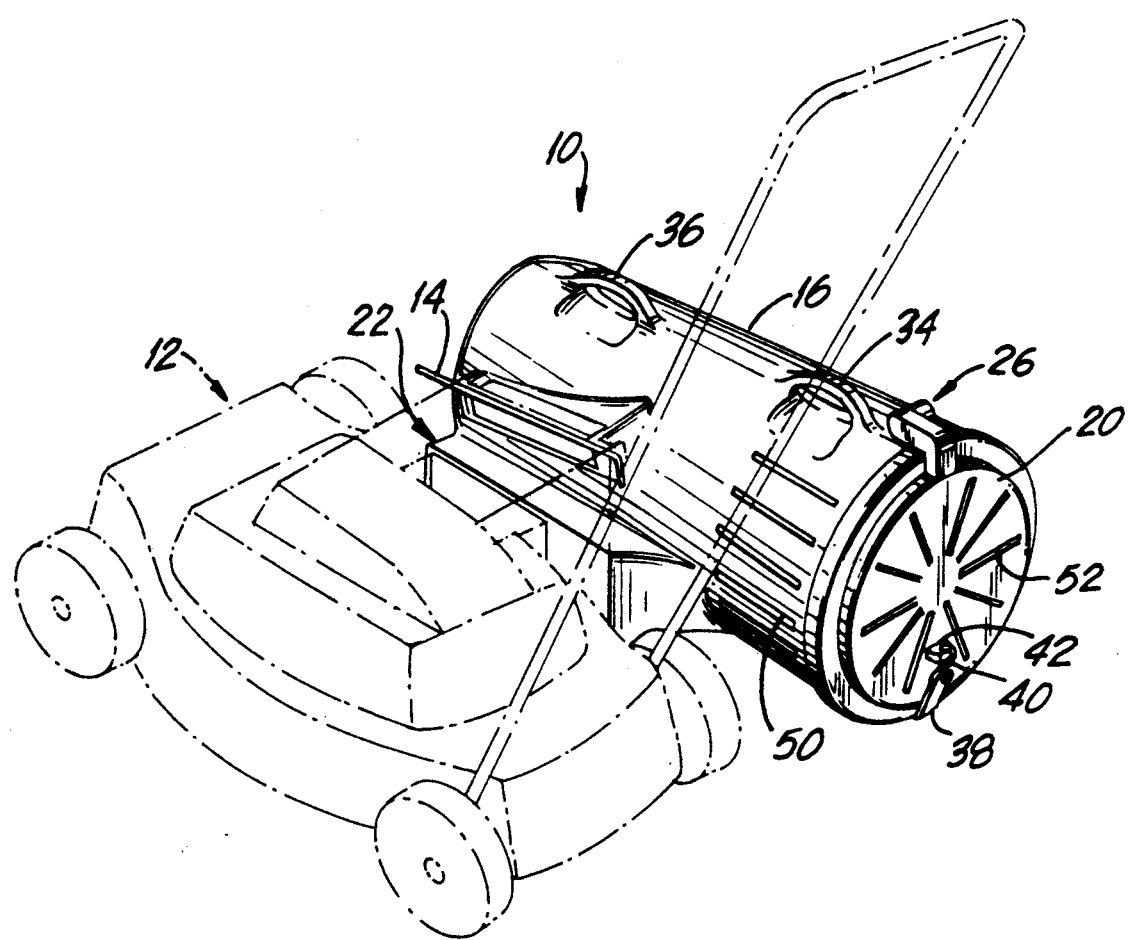
FIG. 1 is a perspective view of the grass catcher of the subject invention mounted to a power mower.

The grass catcher of the subject invention is illustrated in FIG. 1 and is designated generally by reference numeral 10. The laminar flow grass catcher 10 is adapted for attachment to a power lawn mower 12. The grass catcher 10 includes a mounting bar 14 which is adapted to engage an appropriate supporting structure on the power lawn mower 12. Turning now to FIGS. 2-3, the laminar flow grass catcher 10 is a hollow structure of generally tapered cylindrical or frustum shape.

More particularly, the grass catcher 10 includes a tapered cylindrical or frustum shaped side wall 16 and opposed front and rear walls 18 and 20 respectively. The front wall 18 of the grass catcher 10 includes an angularly inclined portion which is inclined relative to the axis of the frustum shaped grass catcher 10. Therefore, the front wall 18 of the grass catcher 10 includes a generally oval shaped portion. The rear wall 20 however, preferably is substantially perpendicular to the axis of the frustum shaped side wall 16 therefore, the rear wall 20 is of generally circular configuration.

The grass catcher 10 includes an entry chute 22 which is disposed adjacent the front wall 18 and which defines an entrance into the grass catcher 10. Moreover, the entrance chute 22 is angularly inclined relative to the axis of the frustum shaped grass catcher 10 such that the angle of inclination of the entrance chute 22 is equal to the angle of inclination of the inclined portion of front wall 18. More particularly, the entry chute 22 defines a generally rectangular aperture 24 which is dimensioned to mate with a corresponding chute on the power lawn mower 12. It is anticipated that not all grass catchers 10 manufactured in accordance with the subject invention would have exactly the same shape entry chute 22. Rather, the entry chute 22 would have a size and configuration dictated by the particular lawn mower 12 to which the entry chute 22 is to be mated.

Turning to FIG. 4, the inclined portion of the front wall 18 will be disposed at an angle between approximately 5° and 30°, and preferably about 10° relative to the longitudinal axis of the frustum shaped side wall 16. This angular alignment of the inclined portion of the front wall 18 contributes to the rearward movement of grass clippings which enter the grass catcher 10 through the similarly inclined entry chute 22. As explained further below, the designed directional movement of the grass clippings if further contributed to by the solid construction of the front wall 18.

The rear wall 20 is hingedly attached to the side wall 16 by a hinge generally designated by reference numeral 26. Preferably, the hinge 26 comprises member 28 which is formed unitarily with rear wall 20 and member 30 which is formed unitarily with frustum shaped side wall 16. The grass catcher 10 further includes unitarily formed handles 34 and 36 disposed in spaced apart relationship on the frustum shaped side wall 16. The handles 34 and 36 contribute to the easy dumping of the grass clippings from the grass catcher 10.

Figure 5:
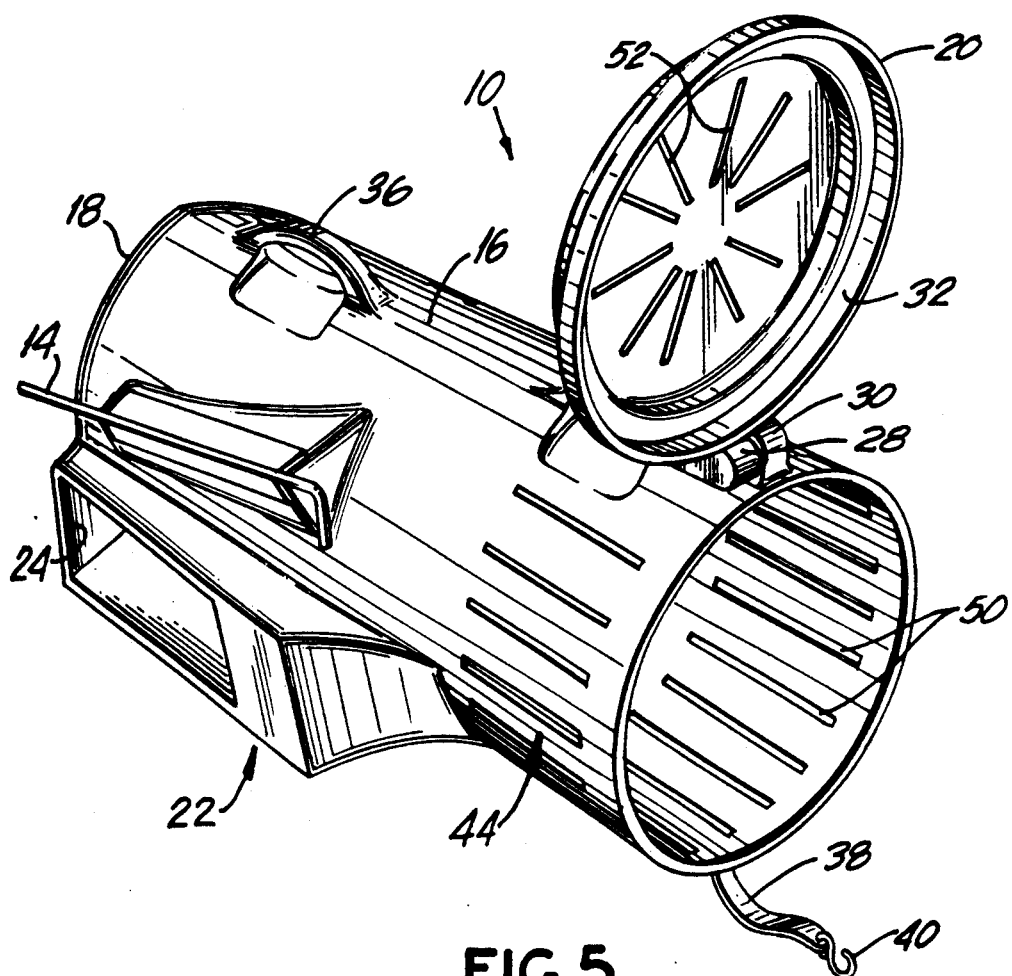
FIG. 5 is a perspective view of the grass catcher of the subject invention.

Turning to FIG. 5, the rear wall 20 further includes an annular lip 30 extending around its periphery. The lip 32 is dimensioned to securely engage the portion of the frustum shaped wall 16 opposite the front wall 18.

A latch 38 as shown most clearly in FIG. 3 extends between the side wall 16 and the rear wall 20. Preferably, the latch 38 defines an elastic member, one end of which is securely attached to the side wall 16 and the other end of which defines a hook 40 engageable with a bracket member 42 which is unitarily formed in the rear wall 20. As a result of this construction, the rear wall 20 functions as a removable lid which can be rotated relative to the side wall 16 about the hinge 26, and which can be selectively and releasably secured in the closed condition by latch 38. The rear wall 20 includes a plurality of radially spaced apart elongated slots 52, which, as explained below, contribute to the desired air flow through grass catcher 10.

The frustum shaped side wall 16 of the grass catcher 10 is provided with a plurality of elongated slots 50.

More particularly, the elongated slots 50 are disposed in three circumferential sets. The first set 44 is disposed adjacent the front wall 18, and extends through a circumferential arc of approximately 100°, the second set 46 is disposed intermediate the front wall 18 and the rear wall 20 and extends through a circumferential arc of approximately 120°, and the third set 48 which extends through a circumferential arc of approximately 320° is disposed adjacent the rear walls 20 of the grass catcher 10.

Figure 6:
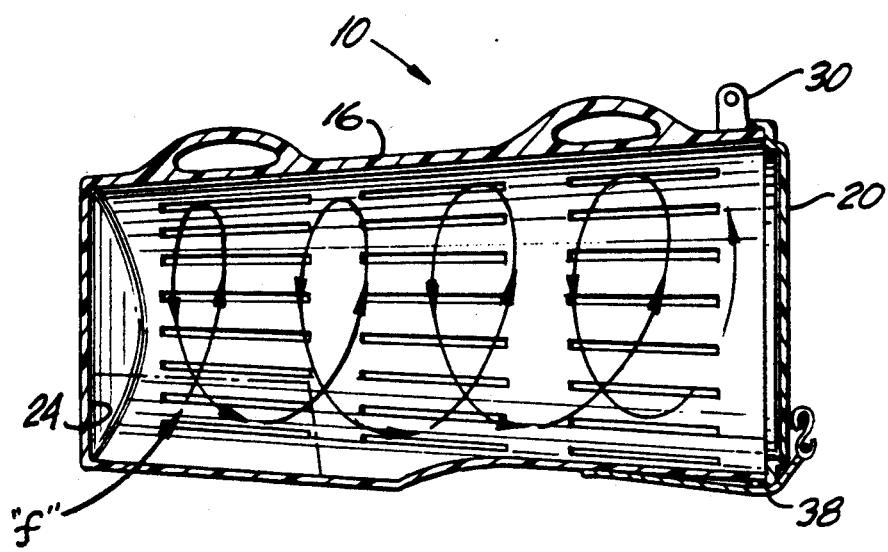
FIG. 6 is a sectional view of the grass catcher taken along line 6—6 in FIG. 3 illustrating the cyclonic laminar air flow within the grass catcher of the subject invention.

Turning to FIG. 6, the unique construction described and illustrated above contributes to a circulatory air flow that ensures the rearward movement of grass clippings in the grass catcher 10. More particularly, the grass catcher 10 is mounted to a lawn mower 12 as shown in FIG. 1. In this mounted position, the entrance chute 22 engages the chute of lawn mower 12 through which the grass clippings are ejected. As the lawn mower is operated, its blades rotate rapidly to trim the grass and to create air flow which causes the ejection of the grass clippings into the angularly inclined entrance chute 22 of the grass catcher 10. The angular alignment and substantially solid, continuous construction of the front wall 18 and the angularly inclined entrance chute 22 initially urges the grass clippings in a generally rearward direction relative to the grass catcher 10. The frustum shaped side wall 16 tends to translate this generally rearward flow of grass clippings and air into a circulatory or helical movement as illustrated by the air flow line "f".

The helical movement of the grass clippings is further assured by the above described elongated slots 50. More particularly, the plurality of elongated slots 50 ensure that there is a boundary layer of laminar air flow immediately adjacent the frustum shaped side wall 16 of the grass catcher 10. Moreover, the elongated slots 50 prohibit the formation and propagation of turbulent air flow in the boundary region adjacent the frustum shaped side wall 16. Hence, the circulatory pattern of air flow "f" within the grass catcher 10 remains substantially continuous throughout the length thereof. Accordingly, the velocity and volume of the air flow remains substantially continuous as the grass catcher is gradually filled. As a result of this enhanced rearward flow of air, the entrance chute 22 of the grass catcher 10 is considerably less likely to become blocked, thus achieving its maximum capacity of grass clippings. Furthermore, the continuous volume of air flow "f" causes the grass clippings to become compacted such that the grass catcher 10 may be filled to its maximum capacity, whereby the power mower 12 may be used over extended periods of time without having to empty the grass catcher 10.

The grass catcher 10 may be removed from the lawn mower 12 after the grass catcher 10 has been sufficiently filled with clippings. The removal is facilitated by the integrally formed handles 34 and 36 disposed in the frustum shaped side wall 16. The grass catcher 10 can be easily carried to an appropriate location for dumping. The dumping can be readily carried out by merely separating the latch 42 from the bracket 38 to enable the rear wall 20 to be articulated about the hinge 26. After a complete emptying of grass clippings from the grass catcher 10, the rear wall 20 can be locked into its closed position by merely attaching the hook 40 to the bracket 38.

In summary, a new and improved grass catcher is provided and is formed substantially from a molded plastic and includes a generally frustum shaped side wall and front and rear end walls. The front wall includes a portion which is angled with respect to the longitudinal axis of the grass catcher. An entrance chute is provided adjacent the front end and is also angled with respect to the axis of the grass catcher. The frustum shaped side wall is provided with a plurality of elongated slots extending around the grass catcher. The elongated apertures contribute to a continuous and undisturbed laminar helical flow of air that will carry the grass clippings toward the rear of the grass catcher. The rear wall of the grass catcher is articulated to facilitate the emptying of the grass catcher.

While the invention has been described relative to a preferred embodiment, it is obvious that various changes can be made therein without departing from the spirit of the invention as defined by the appended claims.

I claim:

1. A generally hollow grass catcher for use with a lawn mower, said grass catcher comprising a frustum shaped structure having an elongated side wall and opposed front and rear walls, said rear wall being articulated to said frustum shaped side wall, an entrance chute formed unitary with said side wall adjacent the front wall of the grass catcher, said entrance chute being mountable to the lawn mower and defining an aperture through which grass clippings generated by the lawn mower enter the grass catcher for movement toward the rear wall thereof, said frustum shaped side wall being provided with a plurality of spaced apart elongated slots disposed substantially parallel to the axis of the frustum shaped side wall in generally side to side relationship, said elongated slots being arranged in a plurality of arcs about the circumference of the frustum shaped side wall, said plurality of elongated slots being operative to enhance circulatory air flow through said grass catcher for facilitating the rearward movement of grass clippings from said entrance chute through said frustum shaped structure towards said rear wall.

2. A grass catcher as in claim 1 wherein the front wall is unitary with the side wall.

3. A grass catcher as in claim 1 wherein the front wall is angularly aligned relative to the longitudinal axis of the frustum shaped side wall.

4. A grass catcher as in claim 3 wherein the angle of the front wall is such that the front and rear walls are closest to one another at their respective points thereon most distant from the lawn mower.

5. A grass catcher as in claim 3 wherein the entrance chute is angularly aligned relative to the longitudinal axis of the frustum shaped side wall.

6. A grass catcher as in claim 5 wherein the angular inclination of the entrance chute is equal to the angular inclination of the front wall.

7. A grass catcher as in claim 1 wherein said elongated slots are disposed in three circumferential sets in said elongated side wall.

8. A grass catcher as in claim 1 wherein the rear wall is provided with a plurality of radially extending slots extending therethrough.

9. A grass catcher as in claim 1 wherein the frustum shaped structure is formed of plastic.

10. A generally hollow grass catcher for use with a lawn mower, said grass catcher comprising a frustum shaped structure having an elongated side wall and opposed front and rear walls, said rear wall being articulated to said frustum shaped side wall, said front wall being unitary with said side wall and including an angularly inclined portion aligned relative to the longitudinal axis of said grass catcher, an entrance chute formed unitary with said side wall and being mountable to said lawn mower and defining an aperture through which grass clippings generated by the lawn mower enter the grass catcher for movement toward the rear wall thereof, said entrance chute being angularly inclined relative to the longitudinal axis of the grass catcher, said frustum shaped side wall being provided with a plurality of elongated spaced apart slots disposed substantially parallel to the axis of the frustum shaped side wall, said plurality of elongated slots being disposed in generally side to side relationship and defining a first arc about the circumference of said frustum shaped side wall adjacent the front wall of the grass catcher, a second arc about the circumference of said frustum shaped side wall intermediate the opposed front and rear walls of the grass catcher, and a third arc about the circumference of said frustum shaped side wall adjacent the rear wall of the grass catcher, said plurality of elongated slots being operative to enhance circulatory air flow through said grass catcher for facilitating the rearward movement of grass clippings from said entrance chute through said frustum shaped structure toward said rear wall.

11. A grass catcher as in claim 10 wherein the angle of the front wall is such that the front and rear walls are closest to one another at their respective points thereon most distant from the lawn mower.

12. A grass catcher as in claim 10 wherein the angular inclination of the entrance chute is equal to the angular inclination of the front wall.

13. A grass catcher as in claim 10 wherein the rear wall is provided with a plurality of radially extending slots extending therethrough.

14. A grass catcher as in claim 10 wherein said first arc of elongated slots extends through approximately 100°.

15. A grass catcher as in claim 10 wherein said second arc of elongated slots extends through approximately 120°.

16. A grass catcher as in claim 10 wherein said third arc of elongated slots extends through approximately 320°.

* * * * *